(12) United States Patent
Cheong et al.

(10) Patent No.: US 7,906,195 B2
(45) Date of Patent: Mar. 15, 2011

(54) SUPER-RESOLUTION MATERIAL AND HIGH DENSITY OPTICAL INFORMATION STORAGE MEDIUM USING SAME

(75) Inventors: Byung-Ki Cheong, Seoul (KR); Taek Sung Lee, Seoul (KR); Hyun Seok Lee, Seoul (KR); Jeung-Hyun Jeong, Seoul (KR); Suyoun Lee, Yongin-si (KR); Won Mok Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 604 days.

(21) Appl. No.: 11/949,927

(22) Filed: Dec. 4, 2007

(65) Prior Publication Data

US 2008/0131688 A1 Jun. 5, 2008

(30) Foreign Application Priority Data

Dec. 4, 2006 (KR) .................. 10-2006-0121215

(51) Int. Cl.
*B32B 3/02* (2006.01)
(52) U.S. Cl. .................. 428/64.1; 428/64.4; 430/270.1
(58) Field of Classification Search .................. None
See application file for complete search history.

(56) References Cited

U.S. PATENT DOCUMENTS 6,965,556 B1 * 11/2005 Kikukawa et al. ............ 369/284

* cited by examiner

*Primary Examiner* — Elizabeth Mulvaney
(74) *Attorney, Agent, or Firm* — Sughrue Mion, PLLC

(57) ABSTRACT

A super-resolution material for recording and reproducing optical information, comprises a semiconductor material which has a transmittance that increases with an increasing intensity of the incident radiation, and one or more elements selected from the group consisting of nitrogen (N), oxygen (O), carbon (C) and boron (B).

12 Claims, 10 Drawing Sheets

SUPER-RESOLUTION MATERIAL AND HIGH DENSITY OPTICAL INFORMATION STORAGE MEDIUM USING SAME

FIELD OF THE INVENTION

The present invention relates to an optical information storage material, and more particularly, a super-resolution optical storage material which can record and reproduce optical information in ultrahigh density.

BACKGROUND OF THE INVENTION

In a conventional optical recording medium, it is not possible to read a recording mark train whose period with a spatial period equal to or less than a certain length. The length of this recoding mark train period is referred to as a diffraction limit. In a reproduction optical system with a wavelength $\lambda$ and a numerical aperture NA, the diffraction limit is $\lambda/2NA$.

The spot size of a full width half maximum (FWHM) is $0.59\lambda/NA$ at the diffraction limit.

If the length of the recording mark is equal to that of a blank area in one period, the length of recording mark is $\lambda/4NA$, which is referred to as a resolution limit. The reproduction of the information from such recording marks was impossible since a radiated beam could not distinguish recording marks smaller than $\lambda/4NA$.

In order for an optical medium to increase the recording density thereof, it is necessary to reduce the wavelength $\lambda$ and/or to increase the numerical aperture NA. However, there are practical limits in changing $\lambda$ and/or NA.

Therefore, a super-resolution optical medium containing a single layer of nonlinear material, has been proposed in U.S. Pat. No. 5,153,873, from which a recorded mark having a size of below the resolution limit can be reproduced.

The super-resolution techniques make it possible to reproduce recorded marks having a size of below the limit of resolution by way of using the optical property of the super-resolution material which changes depending on the intensity of the incident beam. Thus, a super-resolution storage medium can increase the recording density and capacity of an optical recording medium without shortening the wavelength $\lambda$ of the incident beam and the numerical aperture NA of the objective lens.

For the super-resolution techniques to be applicable to any type of optical memories i.e. read-only type, write-once-read-many type and rewritable type, the super-resolution materials are desired to have optical transmittance increasing with an intensity of the incident radiation. Certain semiconductor materials, chalcogenide materials in particular, appear to be the most promising materials of these kinds. These materials exhibit super-resolution properties by way of absorption of an incident laser beam and the subsequent generation of heat leading to modulation in optical property.

Thus, regardless of the memory type, repetitive heating of the medium, involved in repetitive recording and reproducing of information, along with the consumption of laser power is inevitable. Accordingly, there is a need for improving durability of super-resolution media against repetitive heating while providing a higher carrier-to-noise (C/N) ratio at a lower laser power.

SUMMARY OF THE INVENTION

Therefore, the present invention provides a super-resolution material for recording and reproducing optical information, which can exhibit high durability against repetitive recording and reproducing, as well as a high C/N ratio at a lower laser power.

In accordance with one aspect of the present invention, there is provided a super-resolution material for recording and reproducing optical information, comprising a semiconductor material which has an optical transmittance that increases with an increasing intensity of the incident radiation, and one or more elements selected from the group consisting of nitrogen (N), oxygen (O), carbon (C) and boron (B).

In accordance with another aspect of the present invention, there is provided an optical information storage medium comprising one or more layers of the inventive super-resolution material.

BRIEF DESCRIPTION OF THE DRAWINGS

The above and other features and advantages of the present invention will become more apparent from the following description of the invention, when taken in conjunction with the accompanying drawings, in which.

DETAILED DESCRIPTION OF THE INVENTION

The super-resolution (SR) materials used for the optical information storage medium are classified into two types, depending on how optical transmittance, i.e., ratio of transmitted light intensity relative to incident light intensity, varies with the intensity of an incident light. In the following, such SR materials are only considered that have the characteristics of increasing optical transmittance with the intensity of an incident radiation.

Figure 1A:
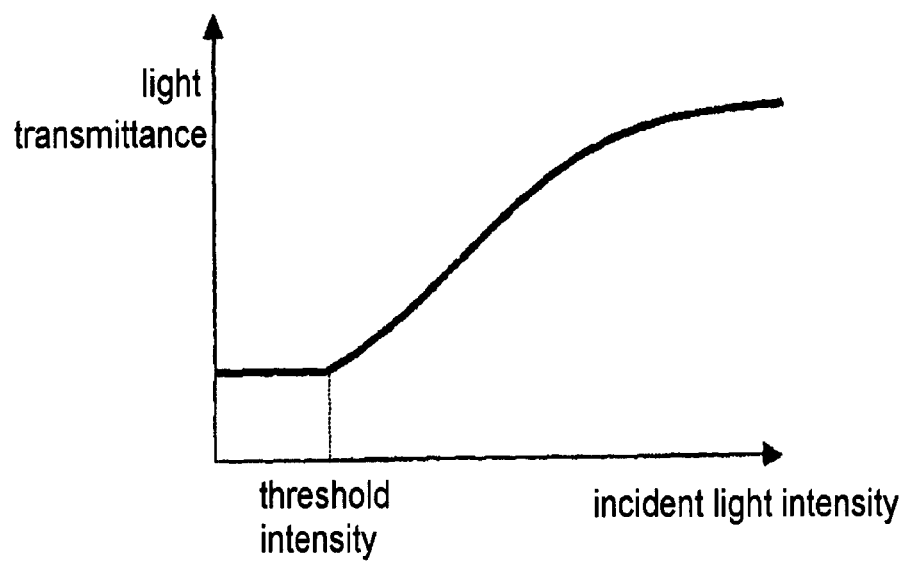
FIGS. 1A and 1B illustrate the transmittance profile depending on the increase in the incident light power, for the material of type 1.
Figure 1B:
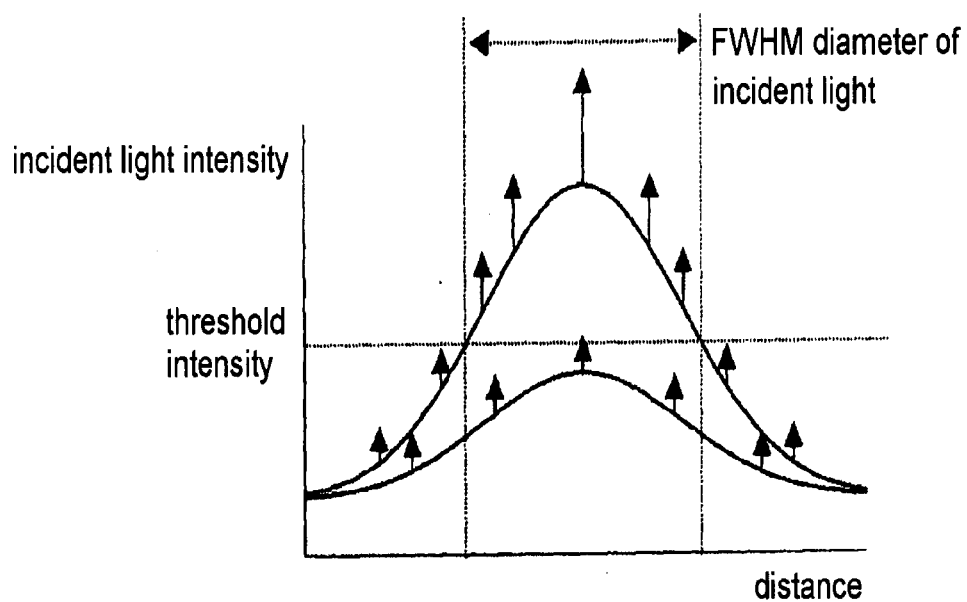

In case of the first type material (type 1), as shown in FIG. 1A, when the intensity of incident light or the temperature due to light absorption is higher than a threshold value (a threshold intensity or a threshold temperature), the transmittance gradually increases with the increase of the light intensity. The intensity profile of incident light in the SR layer, is shown in FIG. 1B. In FIG. 1B, the arrows indicate the relative magnitudes of transmittance depending on the incident light intensity, from which it can be seen that the transmittance continuously change in response to the increase in light intensity or power. The SR material of type 1 has an optical property that the transmittance thereof gradually changes depending on the increase in the light intensity at a light intensity equal to or higher than a threshold value without any structural or chemical change. For example, T. S. Lee et al., J. of Nanosci. and Nanotechnol., 7, 293 (2007); H. S. Lee et al., Proceedings of 1$^{st}$ Joint IMST-EPCOS conference, Grenoble, France, p. 193 (2006).

Figure 2A:
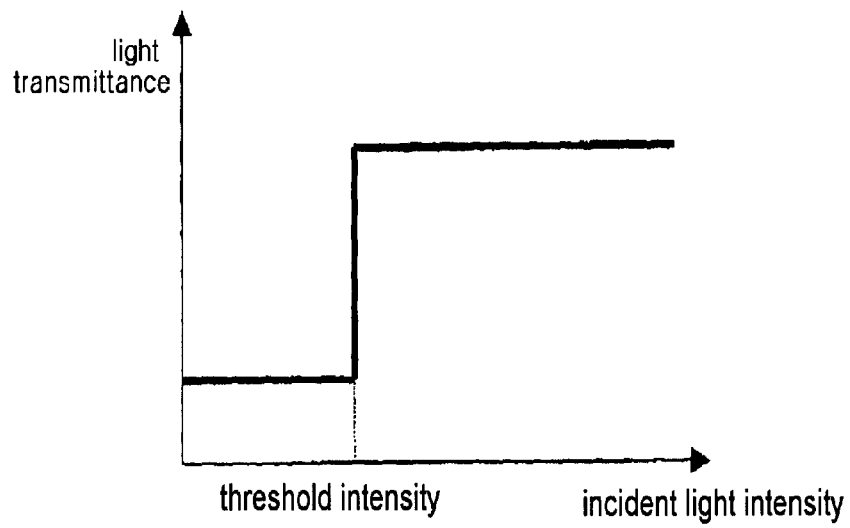
FIGS. 2A and 2B depict the transmittance profile depending on the increase in the incident light power, for the material of type 2.
Figure 2B:
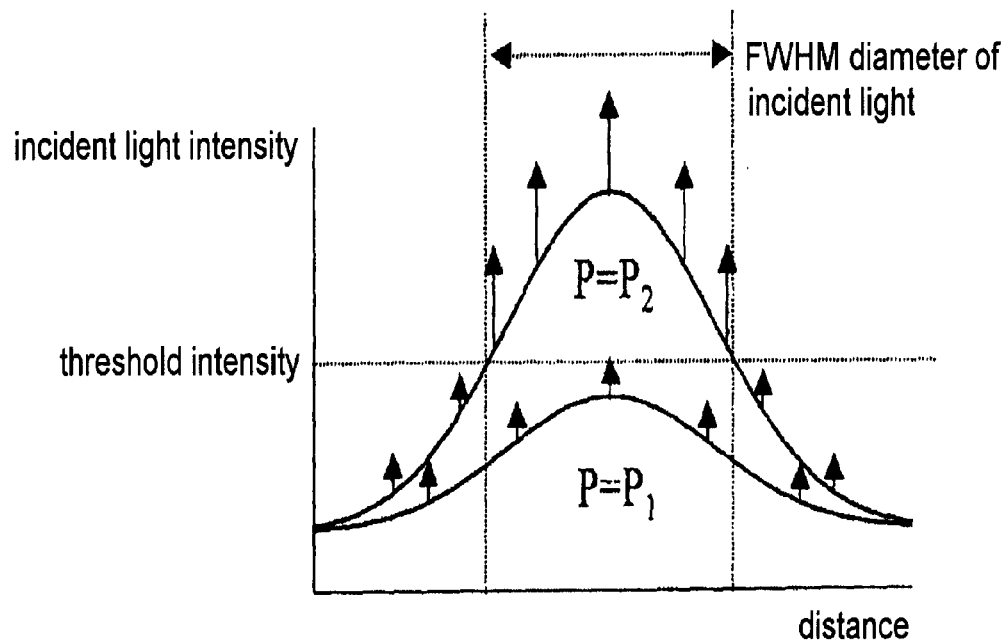

In case of the second type material (type 2), as shown in FIG. 2A, the light transmittance abruptly increases and remains constant at a level higher than the threshold intensity or temperature when the intensity of incident light is equal to or higher than the threshold value. FIG. 2B schematically shows the transmittance profile of the type 2 SR layer depending on the incident light power. The Gaussian intensity profile of incident light on the SR layer bears relatively higher and constant light transmittance at a light intensity equal to or higher than the threshold value. The SR material of type 2 is structurally or chemically discontinuous and involves phase transitions at the threshold intensity (temperature) to have different linear refractive indices and absorption coefficients. For Example, K. Yasuda, M. et al., Jpn. J. Appl. Phys., 32, 5210 (1993).

In order for the SR material to be widely utilized, following requirements should be satisfied regardless of the type thereof.

First, the optical characteristics of the material should be greatly changed and more specifically, the optical transmittance of the material should increase greatly with the increase of incident light power;

Second, the changes in the optical characteristics should be instant and reversible;

Third, the threshold power or temperature should not be so high; and

Fourth, the SR material should have high durability against repetitive recording and reproducing of information.

In the course of radiating focused beam having a Gaussian light intensity profile onto an SR layer, thermal energy is generated with the repetitive appearance and disappearance of electron-hole pairs. Due to the difference in the absorption energy depending on the Gaussian light intensity profile, electron-hole and temperature profiles with gradients are formed in the SR layer. In case of type 1 material in a crystalline solid state, such electron-hole and temperature profile gradients enhance the transmittance profile gradient of incident light. In the area where the temperature and the light intensity are high, the absorption saturation due to the band filling and the increase in the transmittance caused thereby are relatively strong, and the FWHM of the transmitted light intensity profile is reduced. The inventive SR material employing a typical material of type 1 such as PbTe or $Bi_2Te_3$ as its matrix, may further increase the electron-hole profile gradient relative to the given temperature profile gradient due to high thermoelectric effects of the type 1 material.

In case of type 2 material, the thermoelectric effect is not great in a crystalline solid state, but the relative transmittance may be greatly increased by the phase transition from the crystalline solid state to the liquid state. The size of the liquid portion of the SR layer, formed during light radiation, directly affects the FWHM of the transmitted light intensity profile. Although the increase in the transmittance during the phase transition is known to be based on the difference of the optical constants between solid and liquid phases, it is estimated that the thermoelectric effect may also work in the liquid state.

In view of the above principles, as an effective way to decrease the laser power required for recording and reproducing information, the thermal conductivity of the SR material may be reduced.

In case of type 1, thermal diffusion within the SR layer is decreased and the temperature profile gradient and the electron-hole profile gradient increase, resulting in an enhanced light transmittance profile gradient.

Consequently, the transmitted light spot size of the SR layer becomes smaller, thereby equivalent SR effects can be obtained with a lower laser power.

In case of type 2, unless an effect similar to that of type 1 intervenes in a liquid state, only the laser power may be reduced without the increase of the transmittance profile gradient depending on the temperature profile gradient as the thermal conductivity of the SR material is decreased.

Figure 3A:
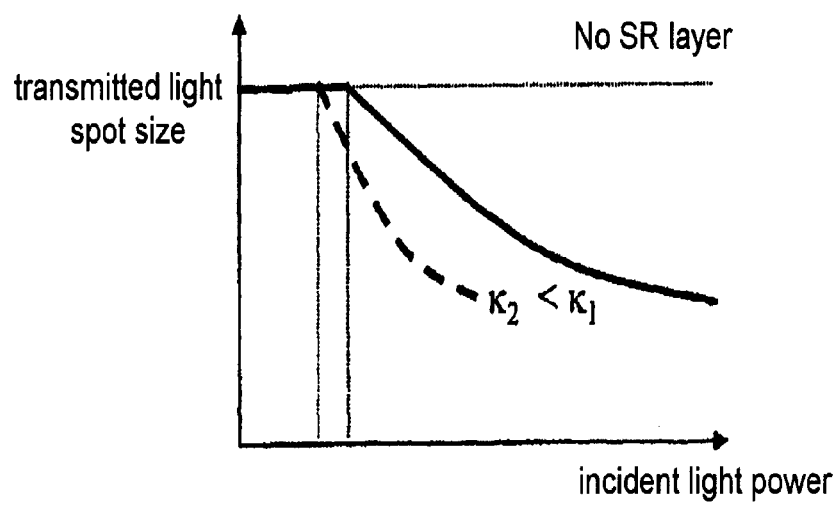
FIGS. 3A and 3B show the transmitted beam spot size depending on the increase of the incident light power, for the materials of type 1 and type 2, respectively.
Figure 3B:
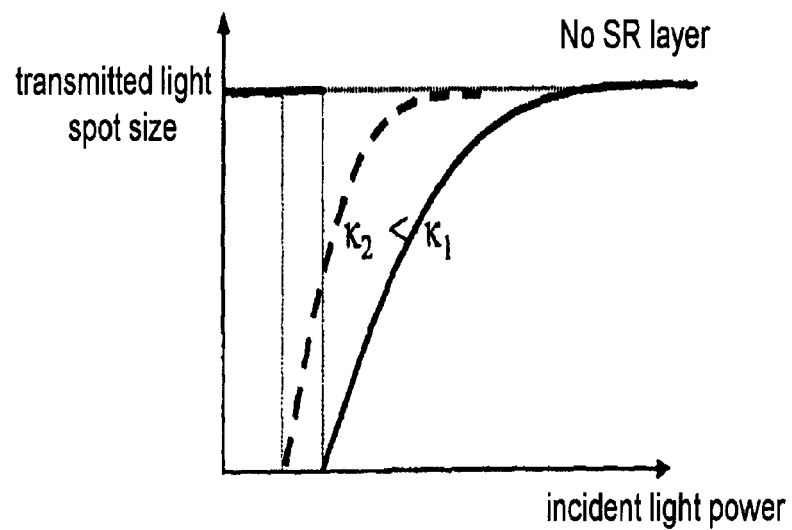

FIGS. 3A and 3B schematically illustrate the relationship between the incident beam power and the transmitted light spot size for type 1 and type 2 SR materials, respectively. As shown in FIGS. 3A and 3B, as the thermal conductivity decreases ($K_2<K_1$), a similar degree of reduction in the spot size may be realized, and, therefore, equivalent SR effects can be obtained with a lower laser power.

Further, the following additional effect may be expected.

That is, if the temperature profile becomes narrower, the thermal load applied to the medium is decreased, which thus contributes to the improvement in the durability of the medium against the repetitive recording and reproducing of information.

In order to attain the above effect of decreased thermal conductivity, in the present invention, a semiconductor matrix is added with one or more elements selected from among nitrogen, oxygen, carbon and boron. These elements may be incorporated into the semiconductor matrix in the form of a solid-solutionized atom or a precipitate of nitride, oxide, carbide, boride, etc. The solid-solutionized atoms or the precipitates not only enhance scattering of electrons or holes and acoustic phonons but also suppress the grain growth of the semiconductor matrix, thus enhancing scattering at the grain boundaries enlarged by the grain refinement, leading to a decreased thermal conductivity.

As mentioned above, the decreased thermal conductivity results in improvement in signal quality and durability of the medium while the laser power for recording and reproducing information is reduced.

In addition, the elements, which are added in the form of a solid-solutionized atom or a precipitate, may suppress the grain growth of the matrix for the SR layer upon heating due to the repetitive laser radiation, thereby stabilizing the microstructure of the crystalline phase, resulting in increased durability and decreased medium noise through the grain refinement.

Also, the precipitates may be formed to constitute a network at the grain boundaries. If the melting point of the precipitate is higher than that of the matrix, deterioration resulted from the flow of the melt phase during the solid-liquid phase transition in the type 2 material may be reduced.

In addition, according to another aspect of the present invention, the SR material may exhibit either or both of a property of increasing light transmittance due to thermo-optical nonlinear effects in a crystalline solid state (type 1) and a property of increasing light transmittance due to the phase transition between the crystalline solid phase and liquid phase (type 2). Thus, type 1 or type 2 may be applied to SR reproduction for a read-only memory (ROM). For a write-once-read-many (WORM) memory or a rewritable memory, type 1 or type 2 may be used for SR recording and reproduction; or, alternatively, type 1 may be used for SR reproduction while type 2 may be used for SR recording.

According to a preferable example of the present invention, the inventive SR material may constitute a information storage layer of an optical information storage medium having one or more information storage layers, and the SR layer may have a thickness ranging from 1 nm to $\lambda/2\pi k$ nm ($\lambda$: wavelength of laser used, k: an extinction coefficient at room temperature), and preferably from 1 nm to $\lambda/4\pi k$ nm.

According to another aspect of the present invention, the super-resolution material may be represented by formula I below:

$$[A]_x[B]_{1-x} \quad (I)$$

wherein [A] is one or more elements selected from the group consisting of nitrogen (N), oxygen (O), carbon (C) and boron (B);

[B] is selected from the group consisting of Si, Ge, As, Sb, Se, Te, and a chalcogenide material selected from the group consisting of a combination of Group IV-VI, V-VI and IV-V-VI, wherein Group IV includes Si, Ge, Sn and Pb, Group V includes As, Sb and Bi, and Group VI includes S, Se and Te; and x is a mole fraction, satisfying 0<x<0.2.

According to another aspect of the present invention, [B] is preferably selected from the group consisting of Sb; a binary material selected from GeTe, SnTe, PbTe, $Sb_2Te_3$, $Bi_2Te_3$ and a solid-solution mixture thereof; a Group IV-V-VI ternary material selected from Ge—Sb—Te, Ge—Bi—Te, Sn—Bi—Te, Pb—Bi—Te, Pb—Sb—Te, Sn—Sb—Te and a solid-solution mixture thereof.

Preferably, the Group IV-V-VI ternary material may have a mole composition of 4-1-5, 2-2-5, 1-2-4, or 1-4-7.

According to another aspect of the present invention, the super-resolution material may be represented by formula II below:

$$[A]_x[M]_y(Sb_aTe_{1-a})_z \quad (II)$$

wherein a is a mole fraction, satisfying $0.6 \leq a \leq 0.85$;

[A] is one or more elements selected from the group consisting of nitrogen (N), oxygen (O), carbon (C) and boron (B);

[M] is one or more elements selected from the group consisting of Ge, Ag, In and Ga; and x, y and z are mole fractions, satisfying x+y+z=1, 0<x<0.2, and 0<y<0.15.

The present invention is further described and illustrated in Examples, which are, however, not intended to limit the scope of the present invention.

EXAMPLE 1

Using a sputtering target having a composition of $Ge_5Sb_{75}Te_{20}$ (atomic mol %), available from Mitsubishi Materials Co., and a sputtering gas composed of argon gas and nitrogen or oxygen gas, a thin film containing nitrogen or oxygen atom was formed by a reactive RF (radio frequency) magnetron sputtering method. The nitrogen or oxygen gas flow rate relative to the total gas flow rate per unit time was 0, 1, 2 or 4%. The sputtering pressure was set to 0.5 mTorr, and the sputtering power was set to 25 W. The film was formed to a thickness of 100 nm on a Si substrate.

Figure 4:
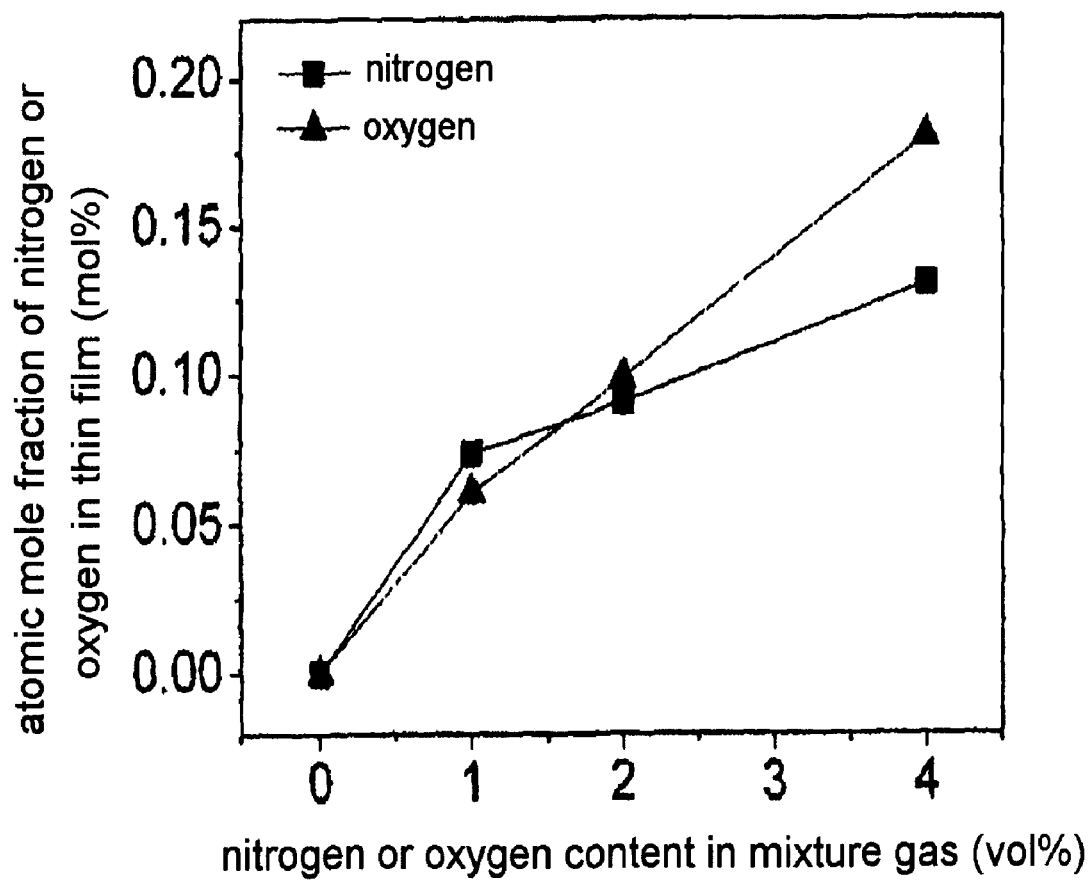
FIG. 4 is a graph illustrating the nitrogen and oxygen contents in the thin films prepared in Example 1.

The amounts of Ge, Sb, and Te in the film were measured using XRF (X-ray fluorescence), and the amounts of nitrogen and oxygen atom were measured using an RBS (Rutherford back scattering) method, thus determining the composition of the thin film. As the results, the composition of the film was $(Ge_{5.4}Sb_{77.8}Te_{16.8})_{1-x}N_x$ or $(Ge_{5.1}Sb_{77.7}Te_{17.2})_{1-x}O_x$ (x is an atomic mole fraction). That is, the amounts of Ge, Sb, and Te in the thin film were maintained nearly constant regardless of the amount of nitrogen or oxygen. The amount of nitrogen or oxygen is shown in FIG. 4.

The thin films in amorphous state, regardless of the composition thereof, were crystallized by thermal treatment at 300° C. for 5 min under the argon gas atmosphere in an RTA (rapid thermal annealing) furnace.

X-Ray Diffraction Analyses

Figure 5A:
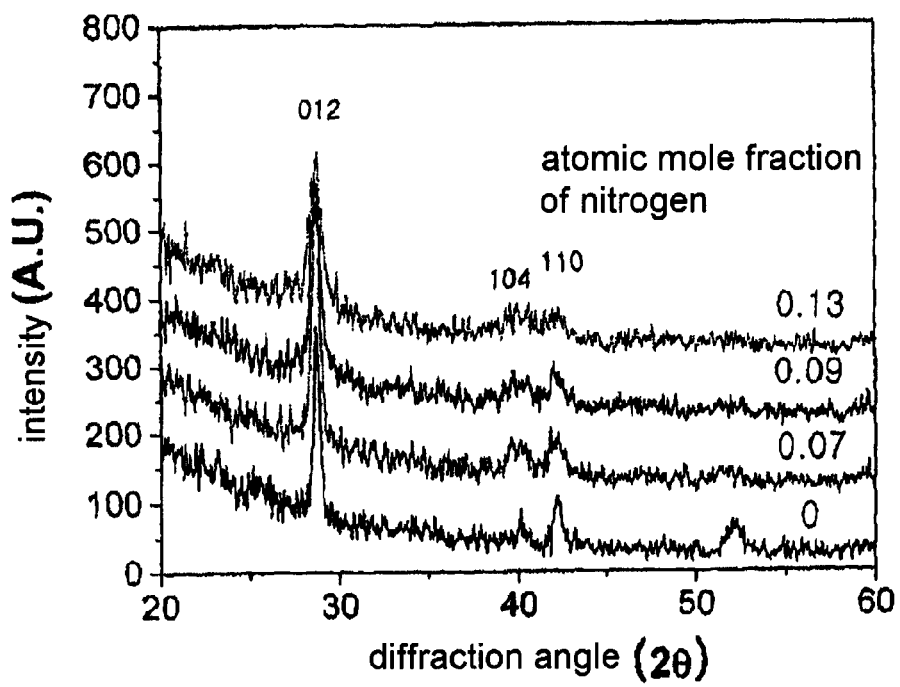
FIGS. 5A and 5B respectively present the X-ray diffraction pattern and the maximum intensity peak position and FWHM depending on the nitrogen content in the crystallized thin films of Example 1.
Figure 5B:
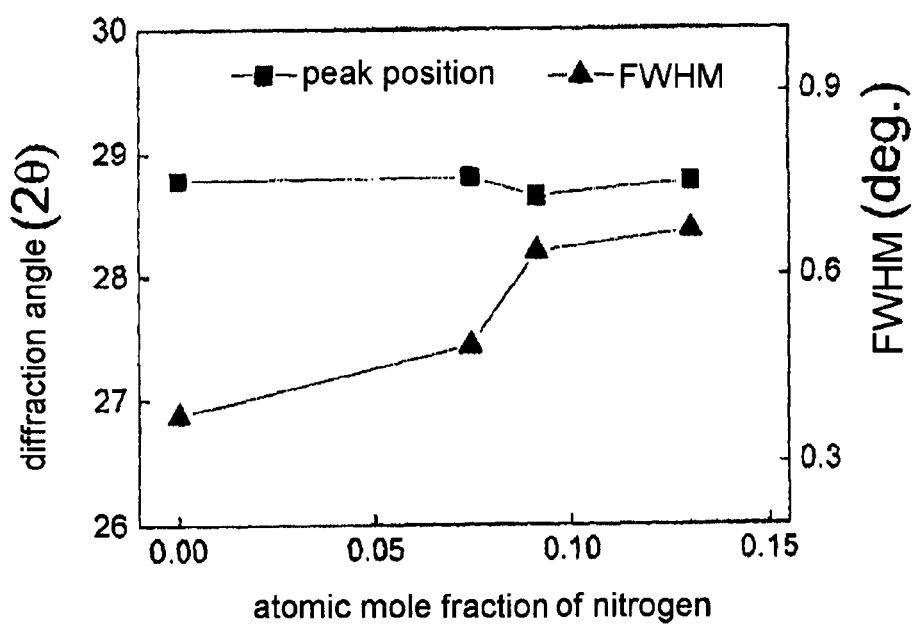
Figure 6A:
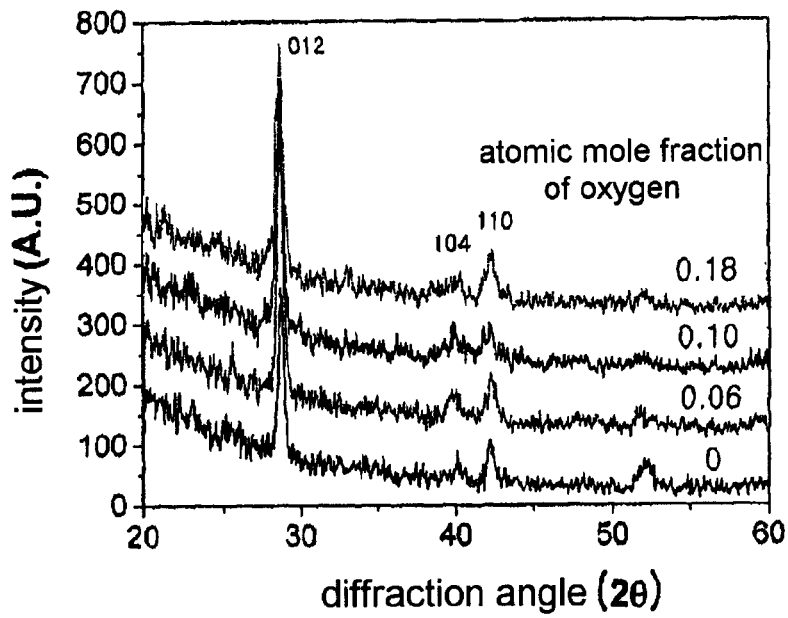
FIGS. 6A and 6B respectively show the X-ray diffraction pattern and the maximum intensity peak position and FWHM depending on the oxygen content in the crystallized thin films of Example 1.
Figure 6B:
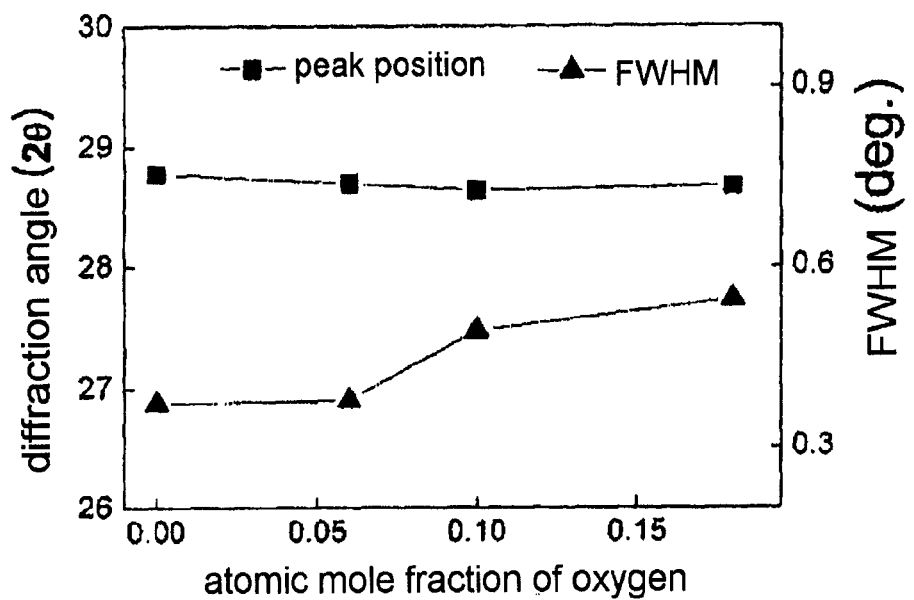

The XRD (X-ray diffraction) analyses of the crystallized thin films containing nitrogen or oxygen were conducted. The results are shown in FIGS. 5A and 5B (for nitrogen), and 6A and 6B (for oxygen), representing the diffraction intensity depending on the diffraction angle, and the diffraction angle change depending on the amount of nitrogen or oxygen. Almost all of the detectable peaks were found due to the hexagonal crystalline structure of the chalcogenide base material composed exclusively of Ge—Sb—Te.

Transmission Electron Micrographs (TEMs)

Figure 7A:
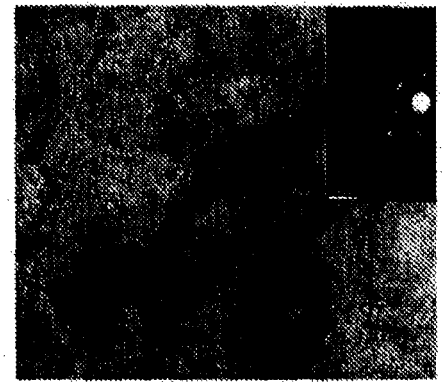
FIGS. 7A, 7B and 7C are transmission electron micrographs (TEMs) of crystallized thin films containing no nitrogen and oxygen, 16 mol % nitrogen, and 18 mol % oxygen, respectively.
Figure 7B:
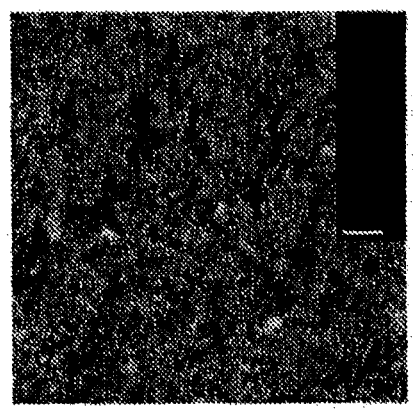
Figure 7C:
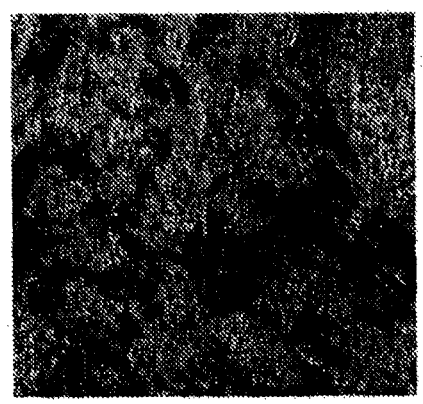

From the fact that the addition of nitrogen or oxygen hardly changes the position of the x-ray peaks, but increases the FWHM of the peak, it is assumed that while uniform deformation of the crystalline structure does not occur, addition of nitrogen or oxygen results in microstructure change including grain size reduction, non-uniform deformation or stacking faults. These results can be seen from FIG. 7A (0 atomic mol % nitrogen or oxygen), FIG. 7B (16 atomic mol % nitrogen), and FIG. 7C (atomic 18 mol % oxygen) which are TEM bright field images and the associated electron diffraction patterns (insert) of the crystallized thin films. The addition of nitrogen or oxygen increases fine features including stacking faults, along with the drastic decrease of the grain size, and, thus, the diffraction pattern shows diffraction rings caused by micro polycrystal structures, instead of diffraction spots resulting from a small number of grains.

Carrier Concentration and Hole Mobility

Figure 8:
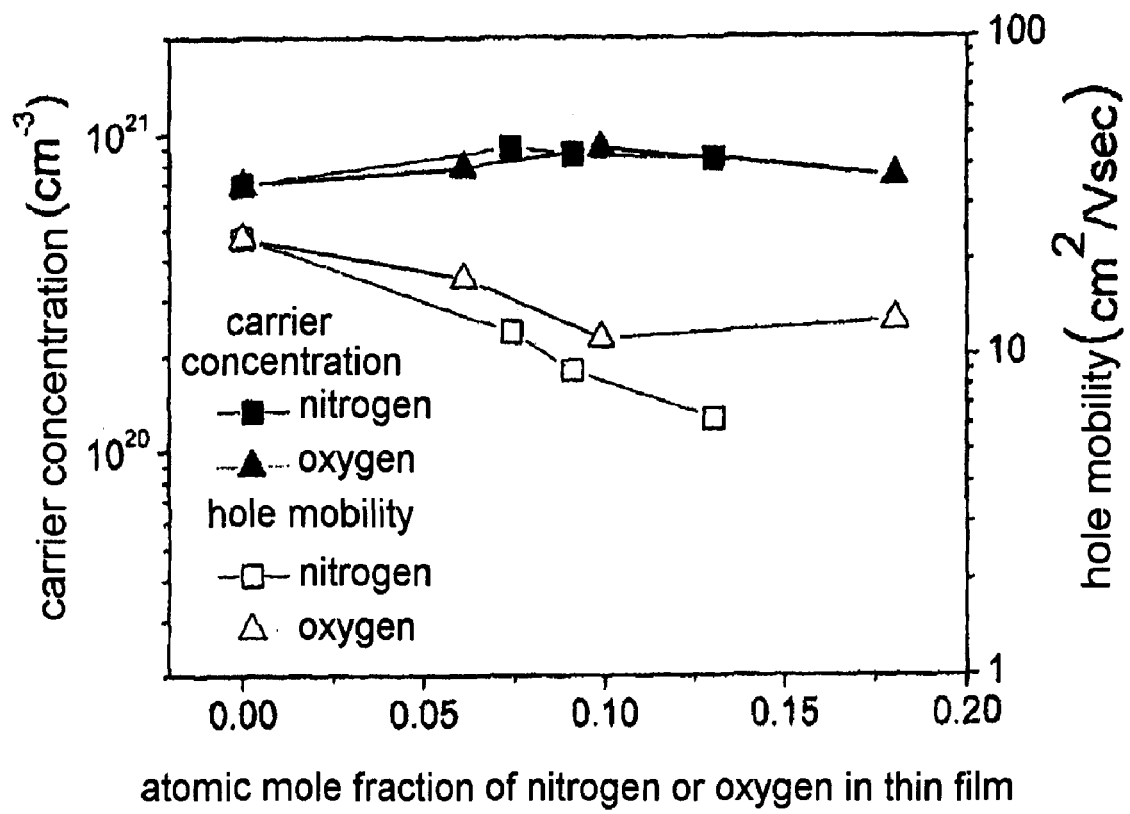
FIG. 8 shows the carrier concentration and the hole mobility of the crystallized thin film containing nitrogen or oxygen.

In order to evaluate the effect of microstructure change on the carrier transport, carrier concentration and hole mobility were measured and the results are shown in FIG. 8. As the amount of nitrogen or oxygen increased, the hole mobility was considerably decreased while the carrier concentration was not greatly changed. The decrease of the hole mobility is considered to result from enhanced scattering of carriers at the structural faults such as grain boundaries. Accordingly, grain refinement of thin film is realized with the addition of nitrogen or oxygen, thus shortening the mean free path of the carrier and the acoustic phonon, consequently decreasing the thermal conductivity of the thin film.

Optical Characteristics

The optical characteristics of the thin films were measured with test samples prepared by successively sputtering three layers of ZnS—$SiO_2$ (150 nm), Ge-doped SbTe having different contents of nitrogen (15 nm) and ZnS—$SiO_2$ (150 nm) on a glass substrate (Corning Inc.), and the resultant test samples were subjected to thermal treatment at 250 for 5 min under the argon atmosphere in an RTA furnace.

Figure 9A:
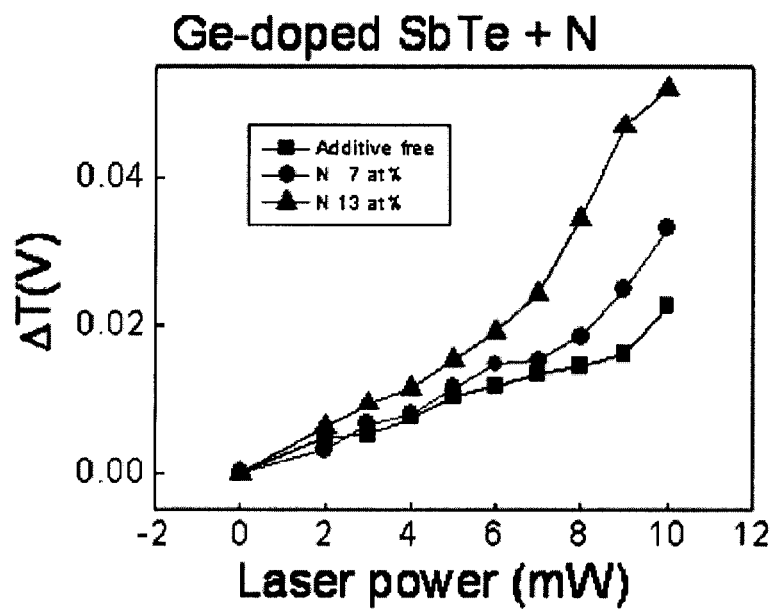
FIGS. 9A and 9B respectively illustrate the transmittance and the reflection of the thin film of Example 1 depending on the laser power.
Figure 9B:
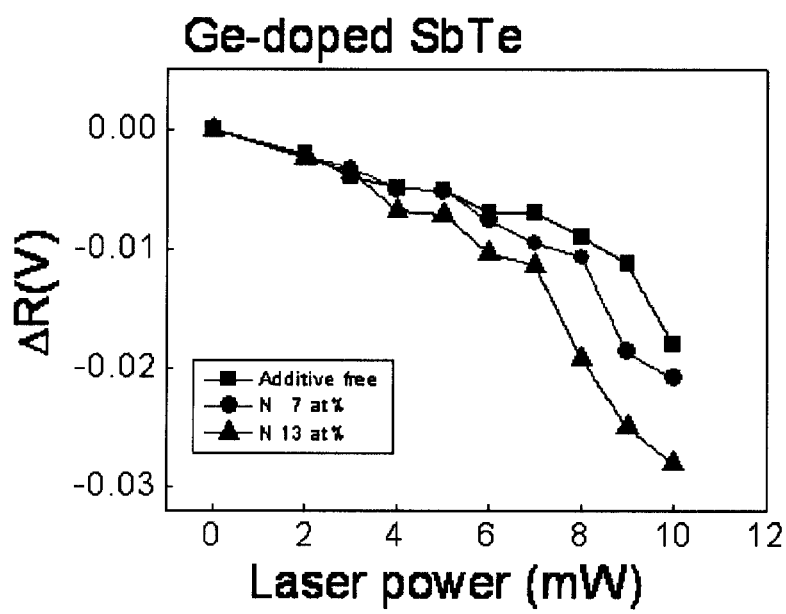

FIGS. 9A and 9B respectively show the transmittances and the reflectances depending on the laser power and the nitrogen content, determined by using an optical system comprising a pulse laser having a wavelength of 658 nm for heating, a continuous laser having a wavelength of 633 nm for detecting signals, and an objective lens having a numerical aperture of 0.6. As can be seen from FIGS. 9A and 9B, with the increase of the laser power for heating, the transmittances increase and the reflectances decrease. Meanwhile, as the content of nitrogen in the thin film increases, the increase of the transmittance and the decrease of reflectances at a specific power become greater. Accordingly, it is reasonably assumed that addition of nitrogen into the thin film SR layer renders the reduction of laser power for reproducing information and the improvement of signal characteristics.

EXAMPLE 2

Using the Sb sputter target (Mitsubishi Materials Co.) and a sputtering gas composed of argon gas and nitrogen, a thin film containing nitrogen atom was formed by a reactive RF (radio frequency) magnetron sputtering method. The nitrogen gas flow rate relative to the total gas flow rate per unit time was 0, 1, or 4%. The sputtering pressure was set to 0.5 mTorr, and the sputtering power was set to 25 W. The film was formed to a thickness of 100 nm on a Si substrate. The nitrogen contents of the thin films determined by RBS method were 4 atomic mol % and 15 atomic mol %, respectively.

Figure 10A:
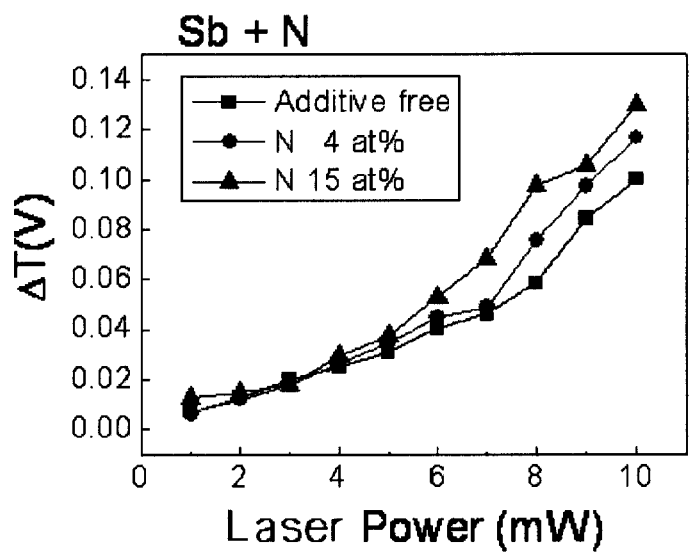
FIGS. 10A and 10B respectively depict the transmittance and the refection of the thin film of Example 2 depending on the laser power.
Figure 10B:
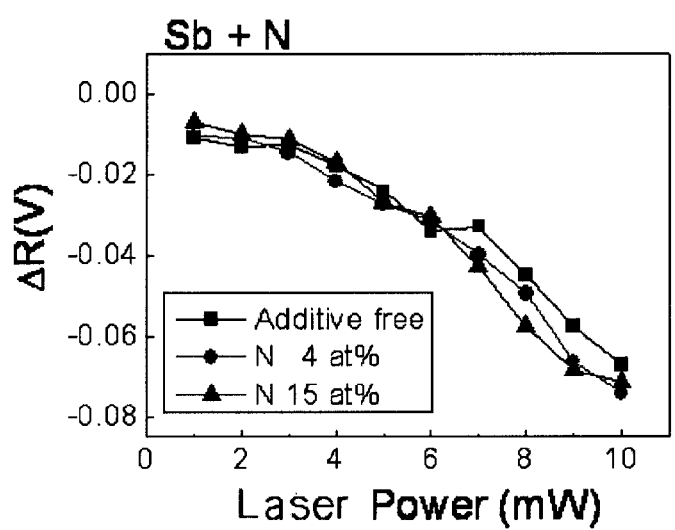

The influences of the nitrogen addition on the optical characteristics of thin films were determined using the same procedures of Example 1. The characteristics of the transmittances and the reflectances depending on the laser power and the nitrogen content are shown in FIGS. 10A and 10B. As can be seen from FIGS. 10A and 10B, with the increase of the laser power for heating, the transmittances increase and the reflectances decrease. Further, as the content of nitrogen in the thin film increases, the changes of the transmittance and the reflectances become greater, thereby possibly leading to more improved SR signal characteristics.

As can be seen from the above, the inventive SR material has a stable microstructure of small grains and low thermal conductivity, and is thus expected to realize lower laser power, a higher C/N ratio, and enhanced durability against the repetitive recording and reproducing. Therefore, the inventive SR material may be effectively applied to ROM, WORM and rewritable optical information storage media having one or more information storage layers.

While some of the preferred embodiments of the subject invention have been described and illustrated, various changes and modifications can be made therein without departing from the spirit of the present invention defined in the appended claims.

What is claimed is:

1. A super-resolution material for recording and reproducing optical information, which is represented by formula I below:

$$A_xB_{1-x} \tag{I}$$

wherein A is one or more elements selected from the group consisting of nitrogen, oxygen, carbon and boron;

B is a chalcogenide material selected from the group consisting of a combination of Group IV-VI, V-VI and IV-V-VI, wherein Group IV includes Ge, Sn and Pb, Group V includes As, Sb and Bi, and Group VI includes S, Se and Te; and x is a mole fraction, satisfying 0<x<0.2.

2. The super-resolution material of claim 1, wherein B is selected from the group consisting of Sb; a binary material selected from GeTe, SnTe, PbTe, Sb2Te3, Bi2Te3 and a solid-solution mixture thereof; a Group IV-V-VI ternary material selected from Ge—Sb—Te, Ge—Bi—Te, Sn—BiTe, Pb—Bi—Te, Pb—Sb—Te, Sn—Sb—Te and a solid-solution mixture thereof.

3. The super-resolution material of claim 2, wherein the Group IV-V-VI ternary material has a mole composition of 4-1-5, 2-2-5, 1-2-4, or 1-4-7.

4. A super-resolution material for recording and reproducing optical information, which is represented by formula II below:

$$A_xM_y(Sb_aTe_{1-a})_z \tag{II}$$

wherein a is a mole fraction, satisfying 0.6<a<0.85;

A is one or more elements selected from the group consisting of nitrogen, oxygen, carbon and boron;

M is one or more elements selected from the group consisting of Ge, Ag, In and Ga; and x, y and z are mole fractions, satisfying x+y+z=1, 0<x<0.2, and 0<y<0.15.

5. An optical information storage medium comprising one or more layers of the super-resolution material of claim 1.

6. The optical information storage medium of claim 5, wherein the layer of the super-resolution material has a thickness ranging from 1 nm to λ/2πk nm, wherein λ is the wavelength of laser used and k is an extinction coefficient at room temperature.

7. The optical information storage medium of claim 5, wherein the super-resolution material is crystalline.

8. The optical information storage medium of claim 5, which is read-only memory, write-once-read-many memory or rewritable memory.

9. An optical information storage medium comprising one or more layers of the super-resolution material of claim 4.

10. The optical information storage medium of claim 9, wherein the layer of the super-resolution material has a thickness ranging from 1 nm to λ/2πk nm, wherein λ is the wavelength of laser used and k is an extinction coefficient at room temperature.

11. The optical information storage medium of claim 9, wherein the super-resolution material is crystalline.

12. The optical information storage medium of claim 9, which is read-only memory, write-once-read-many memory or rewritable memory.

* * * * *